April 15, 1969    M. A. LUFTGLASS    3,439,065
BULK POLYMERIZATION OF VINYL AROMATIC COMPOUNDS
IN PRESENCE OF A MINOR AMOUNT OF WATER
Filed April 30, 1965
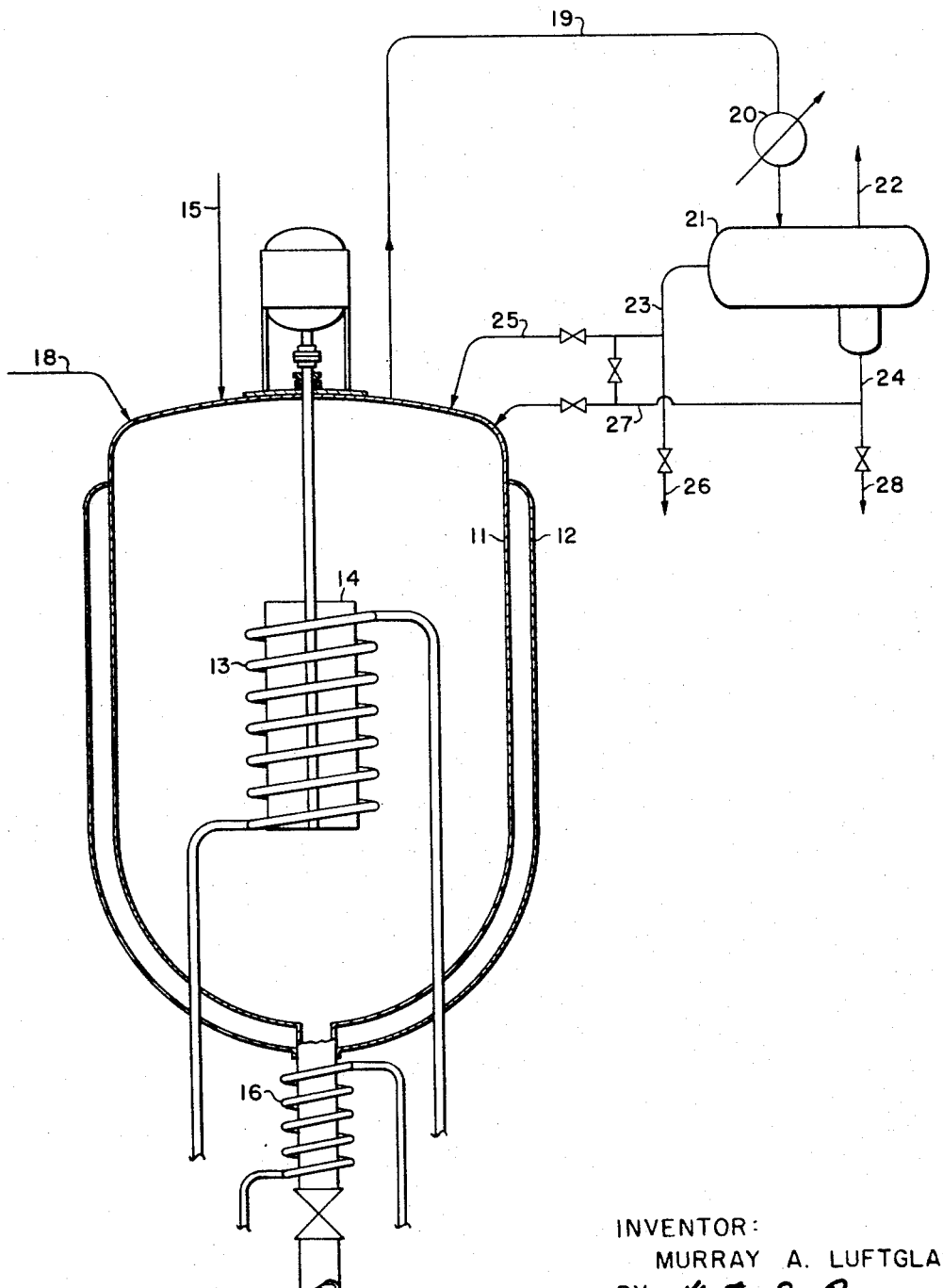
INVENTOR:
 MURRAY A. LUFTGLASS
BY: *Martin S. Baer*
 HIS ATTORNEY

United States Patent Office 3,439,065
Patented Apr. 15, 1969

3,439,065
BULK POLYMERIZATION OF VINYL AROMATIC COMPOUNDS IN PRESENCE OF A MINOR AMOUNT OF WATER
Murray A. Luftglass, Palos Verdes Peninsula, Calif., assignor to Shell Oil Company, New York, N.Y., a corporation of Delaware
Continuation-in-part of application Ser. No. 95,877, Mar. 15, 1961. This application Apr. 30, 1965, Ser. No. 453,886
Int. Cl. C08f 1/04, 1/11
U.S. Cl. 260—880          6 Claims

ABSTRACT OF THE DISCLOSURE

An improved non-catalyzed, non-ionic bulk polymerization process in which part of the heat of polymerization is removed from the reaction mass by evaporative cooling, the improvement consisting of maintaining in the polymerization zone a controlled small amount of water.

---

This application is a continuation-in-part of copending Ser. No. 95,877, filed Mar. 15, 1961, now abandoned.

This invention relates to an improved method of bulk polymerization. The method is particularly useful for bulk polymerization of mono-vinyl aromatic compounds such as styrene.

Bulk polymerization is a well-known method for carrying out the polymerization of monomers or mixtures of monomers. In bulk polymerization the reaction mass consists substantially entirely of one or more polymerizable compounds which polymerize under controlled conditions without the addition of polymerization catalysts or with relatively small amounts of polymerization catalysts, and in the substantial or complete absence of inert solvents.

The present invention applies to the bulk polymerization of a variety of monomers or mixtures of monomers which are substantially immiscible with water and not reactive with water, particularly vinyl and vinylidene compounds. Since the present invention is particularly adapted to the bulk polymerization of styrene or of mixtures of a major proportion of styrene and a minor proportion of other ingredients, the following description will be largely in terms of these particular polymerization systems. It will be understood that when polymerization of feeds "consisting essentially of" a named monomer, e.g., styrene, is referred to, this includes polymerization of feeds containing minor amounts of other components.

Bulk polymerization may be carried out by batchwise or continuous processing in various types of equipment. Kettles provided with heat exchange surface and agitators have been used, as have columns in which the reaction mass passes in one direction through a wide tubular reaction zone which may be equipped with internal or external heat exchange surfaces and with stirring equipment and which may be arranged such that the temperatures of the heat exchange media in several successive zones can be separately controlled. All such apparatus can be used in this invention.

It is known that the product qualities of the finished polymers can be drastically affected by the polymerization conditions, and particularly the temperatures, during various stages of the polymerization. Often polymers of substantially inferior properties are produced because of limitations in polymerization conditions imposed by the methods of indirect and evaporative cooling known to the workers in this art.

A polymer property which is particularly sensitive to polymerization conditions, and especially temperature, is the average molecular weight and molecular weight distribution. A numerical commercial indicator of average molecular weight is the "melt flow" or "melt index" number. This is a measure of the amount of polymer which passes through the orifice of a melt index apparatus at standard condition. In prior processes it has sometimes been difficult to produce polystyrene having a desired relatively low numerical melt flow value; the process of this invention facilities production of polystyrene of desirably low melt flow and with the desired molecular weight distribution.

One of the most difficult problems in successful bulk polymerization of monomers such as styrene is satisfactory control of temperature in the reaction mixture and removal of the very substantial amount of heat liberated in the polymerization process. Heat removal by indirect heat exchange is not a serious problem in the initial stages of polymerization while the reaction mixture is action mixture increases during the course of the reaction, the reaction mixture becomes progressively more viscous. Obviously, heat transfer from the body of the liquid mass to the heat transfer medium becomes increasingly difficult with increasing viscosity. In conventional bulk polymerization of styrene, for example, it is extremely difficult to provide the desired heat transfer as the polymer content increases above 25%; reaction temperatures then often become erratic or even uncontrollable. To provide any fluidity at all the mixture must be at a relatively high temperature; the required high temperature often is so high as to result in polymer having undesirable qualities and even in thermal degradation of the polymer, while still providing only a very viscous mass.

It has been suggested that heat removal be carried out in part by evaporative cooling, which consists in permitting part of the monomer or mixture of monomers to evaporate from the liquid surface of the reaction zone and removing the vapor stream. A disadvantage of this is that the lowest temperature which can be maintained by evaporative cooling of a bulk polymerization system is generally substantially higher than the boiling point of the lowest boiling monomer in the reaction mass, since the presence of polymer in the reaction mixture, as well as any higher boiling monomers, increases the temperature of ebullition.

Evaporative cooling in bulk polymerization is described, for example, in U.S. 2,122,805 to Wulff et al. As pointed out in that patent, it is generally desirable to carry out the polymerization of styrene and the like at temperatures substantially below the atmospheric boiling point of the monomer. The patentees solved this by carrying out the polymerization under vacuum. One of the characteristics of their process is the fact that the viscosity of the reaction mixture is increased as vapor is removed. This, of course, aggravates the problems of heat control by indirect heat exchange in viscous reaction mixtures, as discussed above, and of product flow in equipment for the continuous production of polymers.

Although applied to bulk polymerization of styrene and the like as early as 1930, the evaporative method of cooling has not gained universal acceptance in the industry. Other methods were devised, for example that of U.S. 2,714,101 to Amos et al., which utilized apparatus designed to provide heat transfer surface with very narrow spacing throughout the reaction zone in order to control the temperature of the viscous polyemerization mass. This and other difficult and expensive means have been resorted to for solution of the difficulties of heat transfer in bulk polymerization of styrene and the like. Some commercial producers of high impact polystyrene use filter presses because these have a very high surface to volume ratio and the heat exchange surface is very close to all portions of the reaction mass. Obviously the use of such equipment, which can only be employed in cyclic batch processes, is very expensive.

It is the principal object of this invention to provide a method for carrying out bulk polymerization of olefinically unsaturated monomers, and specifically polystyrene, in which polymer of improved quality can be obtained by virtue of an improved method of operation in the polymerization zone. It is a specific object to provide a practical method for production of polystyrene of improved quality. Another specific object is to provide a method for producing high impact polystyrene of improved quality. Another object is to provide a method for the continuous polymerization of styrene in which at least the final part of the polymerization is carried out in a tower reactor under conditions which facilitate both effective removal of heat of reaction and control of temperature in the reactor.

This invention is based on the discovery that maintaining a small, controlled amount of water at its boiling point in a bulk polymerization mixture in which water is an immiscible, non-reactive ingredient results in a number of beneficial effects, some of them completely unexpected, and permits very substantial improvement in the polymerization process and product.

This invention can be briefly described as an improved bulk polymerization process in which at least part of the heat of polymerization is removed from the reaction mass by evaporative cooling, the improvement consisting of maintaining in the polymerization zone a controlled small amount of water at its boiling point, at least in part as a separate liquid phase.

At high temperatures involved in the process of this invention, water is present in the polymerization mass mainly as a separate liquid phase and as a vapor phase. It was quite unexpected to find that close, consistent control of reaction conditions could be obtained in such a system in which the bulk of the reaction mass generally is at a temperature substantially above the boiling point of water. It has been found that maintaining a controlled amount of water in the range below about 0.5 percent in the polymerization mass in accordance with this invention results in improvement in polymer properties which would be expected from a lowered temperature, but there is no measurable lowering of the temperature of the polymerization mass when water addition is in that range. Addition of greater amounts of water serves to provide a measurable lowering of the temperature of the reaction mass both in the boiling zone and throughout the reaction mass.

It further appears that water has the effect of reducing the viscosity of the liquid reaction mass; by virtue of this effect, indirect heat exchange may be improved even in that part of the reactor where polymerization has advanced to such an extent that ebullition no longer takes place; this effect may also explain the improvement in polymer properties when there is no measurable lowering of liquid temperature. The controllable increase in heat flux by improvement of indirect heat exchange and low temperature evaporative cooling, together with the improved flow properties of the polymer mass combine to permit very substantial operating and plant construction economies by allowing a much higher throughput for a continuous reactor of a given size.

Conventional finishing of the reacted polymer is not affected by the practice of this invention. A possible method comprises, for example: (1) increasing the temperature of the polymer until its viscosity has been reduced sufficiently to enable it to flow from the reactor; (2) passing the molten polymer into an extruder equipped with a vapor removal system for removing small amounts of unreacted monomer and any trace of residual water; (3) extruding the polymer as strands from a multi-hole die in the head of the extruder; and (4) cooling and chopping these strands to form the polymer pellets common to the plastics industry.

The improvements of this invention are obtained both in batch and continuous methods of carrying out bulk polymerization.

In batch polymerization a stirred kettle provided with a jacket and, if desired, with internal heat exchange surfaces and with a suitable agitator, is filled with the desired monomer, such as styrene, or mixture of monomers. The space remaining over the liquid is preferably free from air and oxygen and may be filled with a suitable inert atmosphere such as hydrocarbon vapor or nitrogen. The temperature of the reaction mass is gradually increased by heating it through the heat exchange surface until the polymerization reaction proceeds at a substantial rate, at which time the heat exchange surfaces are used for heat removal. Part of the heat is also removed by evaporation of monomer from the liquid surface. In accordance with this invention a small controlled amount of water in the ranges defined above is added to the reaction mass either initially or after the mass is partially polymerized, and is maintained therein at least during part of the reaction period. Water vapor is withdrawn from the liquid surface of the reaction mass together with monomer vapor. The withdrawn vapor stream is suitably condensed and separated into a water-phase and a monomer phase. Either may be withdrawn from the system or returned to the reaction vessel in whole or in part. Water from an outside source may be added to maintain the desired concentration. After a part of the reaction had been accomplished at conditions attainable in the presence of water, all or part of the water may be withdrawn to allow completion of the reaction at different conditions, if desired. Removal of water is easily accomplished by continuing withdrawal of water vapor but discontinuing addition of liquid water to the reactor. The improved results due to this invention are thought to accrue from being able to maintain closer control of reaction temperatures in large reaction masses than is possible without the addition of water. Control of water addition will be described in further detail hereinafter in connection with a continuous operation.

The continuous polymerization of a monomer or mixture of monomers, e.g., styrene, can be carried out in a simple stirred reaction vessel, provided with heat exchange surfaces, such as has been described for batch polymerization. In continuous operation the vessel is provided with means for continually feeding suitable monomer to the vessel and for continually removing a portion of the polymerization mixture at a sufficiently high temperature to provide fluidity. Again the numerous advantages of this invention are obtained by maintaining in the vessel a small amount of water in the ranges defined above.

In a particulary advantageous method of continuous polymerization a plurality of reactors are employed in series. These may be, for example, two, three, four or more reactors. At steady state conditions polymerization of fresh feed is carried to a desired controlled percentage of conversion in the first stage and to successively higher controlled percentages of conversion in succeeding stages in series. Each stage may consist of a single reactor or of two or more reactors operating in parallel. In the polymerization of styrene in such a system the conversion in the first stage may be carried to between 5 and 40% of that which is theoretically possible, the preferred degree of conversion between 15 and 30%. The rest of the conversion is then suitably carried out in one or more additional stages. In continuous operation in a plurality of stages in series, the present invention provides the greatest advantage in the last of the vessels in series in which evaporative cooling is still employed. It may also be used in intermediate vessels but is usually omitted in the first vessel, which may be termed a prepolymerizer, in which polymer content is not carried above 40% and preferably not above 25%. The fluidity of the reaction mixture is generally sufficient at the conditions of the prepolymerizer to permit adequate temperature control by indirect heat exchange.

In a particularly preferred modification, this invention is employed in a polymerization vessel which has the form of a vertically placed column or tower. The tower generally is relatively tall and narrow. Its L/D ratio is at least 3:1 and typically is still greater. Multiple heat exchange jackets and multiple coils, if desired, may be employed at different levels in the tower reactor to permit separate control of temperatures at the different levels. Agitation, if provided, is such as to avoid disturbing the flow of reactants through the tower, i.e., backmixing is held to a minimum. A typical tower reactor may contain as few as two or as many as six or more separate superimposed temperature stages. Flow of reaction mass in the tower is in a downward direction. The uppermost reaction zone of the tower generally is jacketed but contains no internal indirect temperatrue control means. Cooling in this zone is mainly by evaporation of monomer and water from the liquid surface. This zone is generally at conditions resulting in ebullience, and is known as the boiling zone or evaporative cooling zone. Its temperature is in the range from about 145° to about 175° C. Vapor condensation and return to the reaction may be similar to that employed with a kettle reactor, as described hereafter and illustrated in the drawing. Temperatures of the heat exchange media in the zones down through the reactor typically vary from about 140° to 160° C. in the topmost section to about 175° C. to 180° C. in the central section or sections to about 200° to 210° C. near the bottom of the reactor and the outlet. The feed to the tower reactor suitably is prepolymerized in a prior stage to a content of at least about 15% polymer, the remainder being monomer or minor amounts of various polymer modifying ingredients. The liquid temperature maintained at each level in the tower reactor is sufficiently high to maintain the material in liquid condition but without letting excessively high temperature prevail. Polymerization of monomer continues as the total liquid mass slowly moves down through the reactor. In the lower sections of the reactor the polymerization of styrene is completed so that the product leaving at the bottom thereof contains no more than 10% of unpolymerized styrene and preferably less than 5%. The material leaving the reactor is a viscous liquid; this may be passed through a suitable heated extruder in which it is devolatilized, if desired, and extruded, cooled and chopped or ground to suitable size, as desired. Water is ordinarily not present in measurable amounts in the product removed from the tower. If any water is present, it is removed in the devolatilization step.

A specific embodiment of this invention will be described with reference to the accompanying drawing, which is a schematic representation of a suitable apparatus. For purposes of illustration, this description is made with reference to the polymerization of styrene.

The apparatus consists of a polymerization vessel 11 provided, as heat exchange means, with a jacket 12 and a coil 13 for heating or cooling the contents of the vessel by passing a suitable heat exchange medium therethrough. Suitable heat exchange media are water or steam, or known organic heat exchange media such as, for example, Dowtherm A (a mixture of bisphenyl and diphenyl ether), Dowtherm E (o-dichlorobenzene), Aroclor (a mixture of chlorinated compounds), or high boiling petroleum fractions, used under appropriate pressures. The vessel is also provided with a power driven stirrer 14 to provide thorough agitation of the reaction mixture and with the necessary inlets and outlets.

In employing the vessel in a continuous polymerization process a polymerization feed is introduced through line 15. This feed is primarily a partially polymerized liquid mixture of styrene and polystyrene. The concentration of polystyrene in the feed mixture is suitable between 5 and 40% and preferably between 15 and 30%. In accordance with this invention, the feed may contain a controlled amount of water, as will be described hereinafter in greater detail. Typically, the feed mixture may also contain minor amounts of additives used to modify the polymerization reaction or the properties of polystyrene. This includes, for example, suitable catalysts, rubbery polymers, lubricants or flow agents, polymerization modifiers, oxidation stabilizers, light stabilizers, dyes and the like. The remainder is styrene and polystyrene. The feed is introduced continuously or at frequent intervals at essentially the same rate at which product is withdrawn from the vessel.

A liquid level is maintained in the vessel. The space above the liquid is kept free from air and oxygen. It may be filled with hydrocarbon and water vapor or partly with an inert gas.

Heat exchange means 12 and 13 are used to heat or cool the reaction mixture as required. Generally, during steady state operation the heat of reaction is sufficient to maintain the desired elevated temperature and said heat exchange means, as well as vaporization, are employed to prevent excessively high temperatures.

In accordance with this invention a small controlled amount of water is added to and maintained in the polymerization reaction zone. During continuous operation of the process at steady state conditions, the only amount of water which must be added is that required to replace water removed from the system. Water may be added continuously and removed as a reflux or it may be added initially and total reflux employed. When using the latter method, makeup water is added only in an amount sufficient to compensate for losses. Water may be added as a separate stream in controlled amount through lines 18 and/or 27 or it may be present in the polymerization feed introduced via line 15 or the reflux in line 25. At steady state conditions, water addition from an extraneous source may be required only at infrequent intervals if the water which evaporates from the reactor is continuously condensed and recycled.

The water is largely present as a boiling liquid phase in the uppermost layer of the reaction mass, where ebullition takes place, and as the resulting vapor in the vapor space. Vapors are withdrawn from the vapor space above the liquid level in the reactor via line 19 and condensed in condenser 20. The condenser passes to accumulator 21 in which water and hydrocarbon form separate layers. Any uncondensed gases are withdrawn from the accumulator via vent line 22. Liquid hydrocarbon is withdrawn from the accumulator via line 23 and water via line 24. If desired, all or part of the hydrocarbon condensate may be removed from the system via line 26 and any part not so removed returned to the reactor via line 25. Similarly all or part of the water condensate may be removed via line 28 and any part not so removed returned to the reactor via line 27 or passed to line 25 for return to the reactor. Satisfactory operation of this invention does not depend on any one particular method selected for returning styrene and water condensate to the reactor. They may be injected through suitable distributing devices at the top of the reactor or underneath the liquid surface in the top section of the reaction. They may be added together or separately.

The agitation provided in the polymerization vessel is preferably such as to provide improved homogeneity within the vessel. Thus, maximum use is made of the indirect heat transfer surfaces. The product withdrawn from the reactor through heated outlet line 16 is a viscous fluid. It may be transferred either to additional reactors in series or to the train of finishing equipment. Conventional finishing of the product produced by a continuous polymerization process is not affected by the practice of this invention. The technique for product finishing may be the same as described for the batch process above.

All of the effects due to maintaining a controlled amount of water in the reactor are not known. If water is added to the polymerization zone at a rate greater than about 0.5% of feed, the evaporation of water provides cooling in the top section of the reactor and thus permits maintaining a lower reaction temperature than can be maintained in the same reactor without water. Even a relatively small amount of water, i.e., 2% present in this section is sufficient to permit reducing the temperature at that point almost to the boiling point of water itself a prevailing reactor pressure. This is due to the fact that the water is present as a separate liquid phase and thus its boiling point is not greatly affected by the other constituents. In the sections of the reactor below the top section, down toward the middle level, water may still provide some additional agitation and cooling by ebullition. Even in the lower sections of the reactor, where there is no vaporization, temperatures may be maintained. It is thought that the viscosity of the total reaction mixture may be reduced by very small amounts of water but this is not known with certainty. In any event, it has been clearly demonstrated that, when water is present in amounts between about 0.5% and about 2%, the temperature throughout the reactor is evenly maintained at lower values than otherwise possible. It has also been found that the response of the temperature of the reaction mass to change in temperature of the heat exchange surfaces is much greater and quicker when water is present; this permits much smoother temperature control and thus can result in substantial improvement in product quality. This holds true when water is added at a rate between 0.1 and 0.5%, where it does not result in measurable temperature reduction in the boiling zone.

Various means may be employed for maintaining the correct amount of water in the system. It has been found that a particularly sensitive means is to observe the temperature of a thermocouple located just below the liquid surface in the reactor and to control water addition or withdrawal in response to this reading, to maintain it at a predetermined value.

The precision of temperature control available by using the present invention is illustrated by the following. It was found in operating a tower reactor with water addition of about 0.5 percent, that when as little as 1 or 2 parts by weight of water per 350,000 parts of total tower content were removed from the condenser by a line corresponding to line 28 of the drawing, while no fresh makeup water was being added, the temperature of the liquid in the ebullition zone increased by 5° to 10° C. within 5 to 15 minutes of the withdrawal and the temperature of the polymer mass near the outlet gradually increased by 3° to 6° C. The time for the increase in temperature near the reactor outlet to be completed was only about 1½ hours whereas the time for a particular segment of the feed to move all the way from the top to the bottom of the tower was about 10 hours. By contrast an attempt to change the temperature of the reaction mass by adjusting the coolant temperature in the jacket of the tower required approximately 8 hours to line out the reactor at a new set of temperatures, which were not as low nor as constant as in the runs with water present.

The use of water according to this invention permits the use of pressure in the polymerization reactor. Previously, it was undesirable to use pressure because the attendant increase in the boiling point of styrene resulted in excessively high minimum temperatures. In the present process, temperature can still be controlled under pressure by adding more water. At pressures between 0 and 25 p.s.i.g., the temperatures achieved are generally lower than in the process of the prior art at atmospheric pressure. The use of some pressure in the reactor greatly facilitates the extrusion of polystyrene product therefrom. Operating a polymerization reactor at subatmospheric pressure is ordinarily expensive, difficult, and of no advantage in this invention, and is not within the scope of the process of this invention. Generally pressures from 0 to 5 p.s.i.g. are preferred.

The temperatures of the polymerization masses in this process may be the same or lower than in the prior art. In prepolymerization the temperature is generally in the range from 90° to 110° C. In lower polymerization, it may run from 145° C. in the evaporative cooling zone to 210° C. near the outlet.

Reference has been made to the applicability of water addition according to this invention to any monomer system or reaction method not affected by the presence of water. The description of this invention has been largely in terms of polystyrene manufacture because of the importance of this polymer type and the clear illustration it affords of all the advantages of the invention. This is not to say that the polymerization of other polymerizable olefinically unsaturated compounds, and particularly vinyl and vinylidene compounds, is not benefited equally. The bulk polymerization of vinyl aromatic compounds such as vinyl xylene, the vinyl toluenes (ortho-, meta-, and paramethyl styrene) meta- and para-ethyl-styrene and the like can be more easily controlled according to this invention with the addition of small amounts of water to the reactant mass. The addition of water is also beneficial in the bulk polymerization of such vinyl or vinylidene compounds as vinyl chloride, vinyl acetate, ethyl acrylate, methyl methacrylate or acrylonitrile. Other suitable feeds comprise mixtures of two or more of the above types of compounds.

The polymerization may be carried out in the presence of small amounts of compounds which are known to the art to be useful in free-radical types of polymerizations. For example, there may be present a small amount, e.g., from 0.001 to 1% by weight of a free-radical generating compound; typical of known compounds of this type are benzoyl peroxide, lauroyl peroxide and ditertiary butyl peroxide. The invention is not applicable in ionically catalyzed polymerizations; cationic or anionic catalysts are not employed in the process of this invention.

Low concentrations of lubricants or flow agents such as mineral oil in the 100–500 SSU viscosity range, paraffin wax, butyl stearate or soy bean oil may be incorporated in the polymerization mixture, e.g., in concentrations up to about 10% weight. Polymerization modifiers such as lauryl mercaptan, diisopropyl xanthate and methallyl phosphate may be added to the reaction mass. Oxidation stabilizers and light stabilizers, such as 2,6-di-tert-butyl-4-methylphenol, 2-allyl-1,2,3-benzotriazole (Tinuvin-P) and the like may also be incorporated in the polymerization mass. Color masking agents may be added, such as small amounts of blue dye. The use of these and other additives is not affected by this invention so long as the additive is not one which is destroyed by reaction with small amounts of water.

In a preferred modification of this invention the polymerization is carried out in the presence of from 1 to 15% or more by weight of an unvulcanized elastomer. The use of elastomers to provide polystyrene of modified physical characteristics is known to the art and is not a novel feature of this invention. It is described in some detail, i.a., in U.S. 2,694,692 to Amos et al. Suitable elastomers for addition to the polymerization mass include for example: unvulcanized, unsaturated, conjugated-diolefin containing rubbers, such as synthetic rubber containing in chemically combined form from 50 to 80% by weight of butadiene and from 20 to 50% of styrene; synthetic rubber containing in chemically combined form from 75 to 85% by weight of butadiene and from 12 to 25% of acrylonitrile; synthetic polyisoprene rubber; synthetic polybutadiene rubber; other rubbery copolymers containing unsaturated linkages; and mixtures of rubbers. Although rubbery polymer or copolymer may be added to the polymerization feed in concentrations from 1 to 30% or more by weight, it is preferably added in concentrations of from 1 to 12% by weight. Amounts up to as much as 30% may be present in the reaction mixture in a so-called staged process in which a polymerization mass containing more than the amount of elastomer desired in the final product is mixed with another polymerization mass containing little or no elastomer. The final concentration of elastomer in the polymer is adjusted to give the desired balance of properties, e.g., impact strength, hardness, tensile strength, elongation, etc.

The invention has been described in a preferred modification in which the feed to the reaction in which the invention is practiced is a mixture which contains 5 to 40% of polymer. It is thus evident that this invention is particularly suitable for use in a system in which the first part of the polymerization is carried out in a conventional prepolymerizer and the prepolymerized mixture is then conveyed to the reaction zone operated in accordance with the invention. It will be also apparent that the invention can be similarly utilized in several successive stages in which increasing degrees of conversion are obtained. It is one of the advantages of this invention that it provides a sufficiently accurate degree of control of heat removal in the reactors so that a choice can be exercised in the degree of completion of the reaction. Thus, although it is possible to polymerize a feed to the point at which it contains 1% or less of unconverted monomer, it may sometimes be desirable to operate at the same residence time but at lower temperatures at which from 5 to 10% of the monomer remains unconverted. This choice is made possible by the present invention, which permits reduction of temperature to a level at which some monomer remains unconverted. The unconverted monomer is readily removed in the devolatilization zone.

The method used for adding water to the reaction mixture is of no particular consequence in the present invention. Although water may be added as a separate liquid stream to the reaction zone, it may also be suitably contained in the partially polymerized feed to the reactor. Water may be added in a prepolymerizer as a separate stream. It may be presently dissolved in the monomer, cool aromatics such as styrene having a sufficient solubility for water to introduce required makeup. It may also be present in admixture with one of the other reactant ingredients; for example, it may be present in a rubber added in the form of a latex or an incompletely dried rubber crumb.

The quantities of water required to achieve the beneficial effect of this invention will vary with the design and manner of operation of the polymerization equipment; and since the temperatures in the reactor have been discovered to be extremely sensitive to minute adjustments in the water level for a given operation, only general indications of the rate of water throughput and water concentrations can be given. Broadly, the concentration of water present in the portion of the polymerization mass in which ebullition takes place is estimated to be generally below about 5% by weight and above about 0.05% by weight, and to be preferably between 0.1 and 0.3%. The rate at which water is added to the reactor, including recycle, is generally between 0.1 and 2.5 by weight, based on the amount of feed to the reactor. When the amount of water added is below about 0.5% by weight, based on feed to the polymerization, a small lowering of the vapor temperature in the vapor zone above the boiling zone is observed, but no effect on the bulk temperature in the polymerization zone can be measured; nevertheless, water addition above about 0.1 to 0.2 and below about 0.5% by weight results in significant decrease in melt flow and a slight, but important, increase in Izod impact strength of the resulting polymer. When water addition is above about 0.5 by weight, there is a measurable lowering of the polymerization temperature and further improvement in properties. However, as the amount of water added increases in the range from 0.5 to 2.5% by weight, process control becomes increasingly more difficult. Water contents above 2.5% are not practical because they tend to cause frequent upsets in process conditions. In general, it is preferred to limit water addition to the polymerization zone to less than 2.0%, and most preferably no higher than about 0.5%.

In the following specific examples water concentrations are given which are pertinent to the operations described therein, but it must be recognized that these examples are merely illustrative and do not limit the discovery of this invention that use of small controlled amounts of water substantially improves temperature control and product properties in bulk polymerizations.

Example 1

Styrene polymerization is carried out in a system consisting of a stirred kettle prepolymerizer and a tower reactor. The prepolymerizer is operated at a temperature in the range of 90° to 150° C. for a sufficient time to result in 15 to 30% conversion of styrene monomer to polymer. The reaction mixture is then transferred to a tower in which most of the polymerization takes place at or near the top surface of the charge. Part of the heat of reaction is removed from this tower by allowing the styrene (and water, when present) to vaporize, condensing the vapor and returning the condensate to the reaction mass. The remaining heat of reaction raises the temperature of the reaction mass. The product moves slowly down the tower and is extruded and pelletized. The product is devolatilized to remove residual monomer.

The results of several different polymerization runs are listed in Table 1 below. For comparative purposes the tower is operated in a continuous operation both without the addition of water and with the addition of water in accordance with this invention. Product in both cases is a polystyrene modified by the addition of a styrene-butadiene synthetic rubber to produce the so-called "high-impact" grade. In the water addition run, water is added to the original styrene-rubber solution to the prepolymerizer in the amount of 0.1% by weight, based on total feed. At the equilibrium temperature conditions shown in Table 1 an amount of water equivalent to that contained in the feed is drawn off from the vapor condenser by a line corresponding to line 28 of the drawing. On the basis of time to reach equilibrium conditions and the known volume of the reactor, it is estimated that the equilibrium water inventory is 1–2% by weight of the boiling monomer-polymer mixture for the particular polymer composition, degree of monomer conversion in the prepolymerizer, reactor throughput, and conformation of reactor equipment used in these runs.

In Table 1 there are listed the minimum temperatures and average temperatures at various points in the tower corresponding to the specified reaction time. The total holdup time in the tower is about 20 hours. The tower contains three separate cooling zones in which the heat exchange medium is maintained at the temperatures shown in Table 1.

The data in Table 1 clearly illustrate the substantial reduction in temperatures obtainable throughout the upper part of the tower, where substantially all the polymerization takes place, when operating in accordance with the present invention. The viscosity improvement in the lower zones is shown by the smaller temperature differences between reaction and coolant temperatures.

It was found that when the products from the above operations were compared, the product made by the process in which no water was maintained in the polymerization tower and in which the average temperatures in the tower ranged from 150 to 205° C. had a substantially lower Izod impact value, average heat distortion temperature and higher melt flow than a product prepared in an identical continuous operation in which, however, 1–2% of water, based on the estimated weight of product in the boiling zone (1 hour product residence time), was maintained in the reactor.

TABLE 1

| Method reaction time, hours | Without water | | | With water | | |
|---|---|---|---|---|---|---|
| | Minimum temp., °C. | Average temp., °C. | Coolant temp., °C. | Minimum temp., °C. | Average temp., °C. | Coolant temp., °C. |
| 0 | 150 | 150 | | 110 | 125 | |
| 2 | 170 | 175 | | 125 | 150 | |
| 4 | 180 | 185 | 110 | 125 | 175 | 110 |
| 6 | 190 | 195 | | 160 | 180 | |
| 8 | 190 | 190 | 180 | 170 | 185 | 180 |
| 20 | 185 | 185 | 185 | 175 | 185 | 185 |

Example 2

A series of polymerizations similar to those of Example 1 are carried out in an apparatus in which styrene is polymerized in three successive reactors, the third being a tower polymerizer. The feed for this series of reactions again is a synthetic-rubber modified styrene monomer containing minor amounts of lubricant and anti-oxidant additives.

The first and second reactors are operated at a temperature of 96 to 99° C. to a total conversion of about 30%, and the tower reactor at temperatures which increase from the top to the bottom of the column, the final conversion being about 96%.

The amount of water maintained in the reactor is approximately 4–6% by weight of the contents of the boiling zone. During each of the operations 0.1% of water based on the reaction mixture enters the tower reactor as a result of having been added to the prepolymerizer feed. In the operation illustrated in the first column, all water vaporized from the top of the reactor is continuously removed before reflux is returned to the reactor, so that the reaction mass in the column is essentially dry. In the operation with water recycle, only a portion of the total water is removed from the reflux stream, the remainder being returned to the top of the tower so that the water content is in the range from 4–6%, by weight, of the boiling polymer. The larger quantity of water, compared to Example 1, is a consequence of a smaller surface to volumn ratio of the apparatus and a higher throughput rate. Removal of water from the reflux stream is controlled by observing changes in the temperature near the top of the reactor. It was found that the removal of as little as 1 part by weight of water per 250,000 parts of total tower content effected a rise in the temperature near the bottom of the reactor of from 3 to 6° C. It was also found that properties of the polymer produced were clearly improved by operating the tower in the presence of water according to this invention. This improvement in properties is shown in Table 2.

TABLE 2

| Method | No water | Water addition |
|---|---|---|
| Izod impact strength | 0.79 | 1.00 |
| Heat distortion, °F | 175 | 178 |
| Hardness, Rockwell M | 33 | 37 |

Table 3 shows the effective range in temperatures measured at the top, middle and bottom of the tower reactor both with and without maintenance of water in the top section of the reactor.

TABLE 3

| Location of thermocouple | No water recycle | | Water recycle | |
|---|---|---|---|---|
| | Temp. range, °C. | Average temp., °C. | Temp. range, °C. | Average temp., °C. |
| Top of reactor | 149–166 | 152 | 116–138 | 132 |
| Middle of reactor | 160–182 | 171 | 160–171 | 163 |
| Side of reactor, near bottom | 171->205 | 177 | 163–185 | 174 |
| Bottom head of reactor | 202->205 | | 196–202 | |

It is particularly noteworthy that operation according to this invention not only resulted in reduced average temperatures, but also greatly reduced the range of temperature fluctuation in the tower.

Example 3

In the equipment described in Example 2, 0.25% of water based on the reaction mixture enters the tower reactor as a separate stream. All water in the reflux is removed and discarded so that the water content is held at ca. 0.25% by weight of the polymer in the boiling zone. Compared to operation in which the separate stream of water is not added, although liquid temperatures in the reactor are unchanged, Izod impact strength increases ca. 0.1 ft. lbs./inch notch and melt index decreases.

TABLE 4

| | Medium impact polystyrene | | High impact polystyrene | |
|---|---|---|---|---|
| | No water | Water addition | No water | Water addition |
| Izod impact strength, ft. lbs./inch notch | 0.6 | 0.7 | 0.85–0.95 | 0.90–1.00 |
| Melt index (G), gms./10 min | 12 | 10 | 7–8 | 5.6 |

Example 4

Two runs are carried out as in Example 1, but using a feed consisting essentially only of styrene, free of rubbery polymer. The resulting temperature distributions in the tower are very similar to those shown in Table 1, and product made in the runs with water addition according to this invention is superior in quality to that made without water addition.

Similarly beneficial results are obtained by substituting a feed consisting essentially of a mixture of vinyl toluene isomers, predominantly the ortho and meta isomer, for the feed in Example 1.

I claim as my invention:

1. In a process for the non-catalyzed, non-ionic bulk polymerization at a pressure in the range from 0 to 25 p.s.i.g. of a feed which is substantially immiscible with water and which contains as sole polymerizing constituents vinyl aromatic compounds, in which process at least part of the heat of polymerization is removed by evaporation of monomer from the bulk of the reaction mass in an evaporative cooling zone which is the upper part of a polymerization zone, the improvement which comprises introducing into the polymerization zone an amount of water in the range from 0.1 to 2.0 percent by weight, based on feed to said polymerization zone and continuously removing water vapor from said evaporative cooling zone together with monomer vapor.

2. In a process for the non-catalyzed, non-ionic bulk polymerization of styrene at a pressure in the range from 0 to 25 p.s.i.g. in which process at least part of the heat of polymerization is removed by evaporation of monomer from the bulk of the reaction mass in an evaporative cooling zone which is the upper part of a polymerization zone, the improvement which comprises introducing into the polymerization zone an amount of water in the range from 0.1 to 2.0 percent by weight, based on feed to said polymerization zone and continuously removing water vapor from said evaporative cooling zone together with monomer vapor.

3. The improved process according to claim 2 in which the reaction mass in said polymerization zone contains from 1 to 30 percent by weight of an unvulcanized, unsaturated, conjugated-diolefin-containing rubbery polymer.

4. The improved process according to claim 3 in which said rubbery polymer is a synthetic rubber containing in chemically combined form from 50 to 80 percent by weight butadiene and from 20 to 50 percent by weight styrene.

5. The improved process according to claim 2 wherein said rubbery polymer is polybutadiene.

6. In the non-catalyzed, non-ionic bulk polymerization of styrene at a pressure in the range of 0 to 25 p.s.i.g. in a reaction system consisting of a first polymerization zone in which no more than about 40 percent of the polymerization takes place and a second elongated vertical polymerization zone in which the remaining polymerization takes place while the reaction mass passes down through it, the contents of said second zone being cooled in part by indirect heat exchange and in part by evaporation of styrene from the bulk of the reaction mass in an evaporative cooling zone at the top of said second polymerization zone, the improvement which comprises introducing into said second polymerization an amount of water in the range from 0.05 to 2.0 percent by weight, based on feed to said polymerization zone and continuously removing water vapor from said evaporative cooling zone together with monomer vapors.

References Cited

UNITED STATES PATENTS

| | | | |
|---|---|---|---|
| 2,122,805 | 7/1938 | Wulff et al. | 260—93.5 |
| 2,533,525 | 12/1950 | Snyder | 260—93.5 |
| 2,694,692 | 11/1954 | Amos et al. | 260—880 |
| 3,067,185 | 12/1962 | De Coene et al. | 260—93.5 |
| 3,222,294 | 12/1965 | Meyer et al. | 260—93.5 |

JAMES A. SEIDLICK, *Primary Examiner.*

U.S. Cl. X.R.

260—93.5, 92.8, 89.1, 89.5, 88.7, 45.8, 45.95